United States Patent
Parvaresh

(10) Patent No.: US 9,862,307 B2
(45) Date of Patent: Jan. 9, 2018

(54) VEHICLE EMERGENCY LIGHT BEAM SYSTEMS

(71) Applicant: Kambiz Parvaresh, Mineola, NY (US)

(72) Inventor: Kambiz Parvaresh, Mineola, NY (US)

( * ) Notice: Subject to any disclaimer, the term of this patent is extended or adjusted under 35 U.S.C. 154(b) by 0 days.

(21) Appl. No.: 15/247,808

(22) Filed: Aug. 25, 2016

(65) Prior Publication Data

US 2017/0088047 A1 Mar. 30, 2017

Related U.S. Application Data

(60) Provisional application No. 62/284,226, filed on Sep. 24, 2015.

(51) Int. Cl.
| | | |
|---|---|---|
| *B60Q 7/00* | (2006.01) | |
| *B60Q 1/26* | (2006.01) | |
| *B60Q 1/52* | (2006.01) | |

(52) U.S. Cl.
CPC ............ *B60Q 1/2615* (2013.01); *B60Q 1/52* (2013.01)

(58) Field of Classification Search
CPC ................................ B60Q 1/2615; B60Q 1/52
USPC .................... 340/473, 815.45, 321, 326, 328
See application file for complete search history.

(56) References Cited

U.S. PATENT DOCUMENTS

| | | | | |
|---|---|---|---|---|
| 5,450,058 A | | 9/1995 | Collier | |
| 5,512,876 A | | 4/1996 | Brusca | |
| 5,825,280 A | * | 10/1998 | Merendini | G08B 7/06 340/321 |
| 6,000,811 A | | 12/1999 | Bordak | |
| 6,188,317 B1 | | 2/2001 | Wang | |
| 8,142,045 B2 | * | 3/2012 | Peak | B60Q 7/00 362/183 |
| 2014/0285355 A1 | * | 9/2014 | Matte | G08B 5/36 340/815.45 |
| 2015/0311747 A1 | * | 10/2015 | Chu | H02J 7/355 307/18 |

FOREIGN PATENT DOCUMENTS

DE 20031085 9/2004

* cited by examiner

*Primary Examiner* — Tai T Nguyen
(74) *Attorney, Agent, or Firm* — Integrity Patent Group, PLC; Edwin Wold

(57) ABSTRACT

A vehicle emergency light beam system for the purpose of coupling to a disabled vehicle in order to warn oncoming motorists with indirect lighting. The rear facing light utilizes a programmable plurality of light fixtures each of which is directed using a light visor extension in a manner that avoids blinding an approaching driver. The device can emit various light colors and modes such as strobe, flashing, or constant light making it versatile in the event of a breakdown no matter what time of day it is. The device may be removably coupleable to a vehicle or alternately integrated into a vehicle's body.

20 Claims, 5 Drawing Sheets

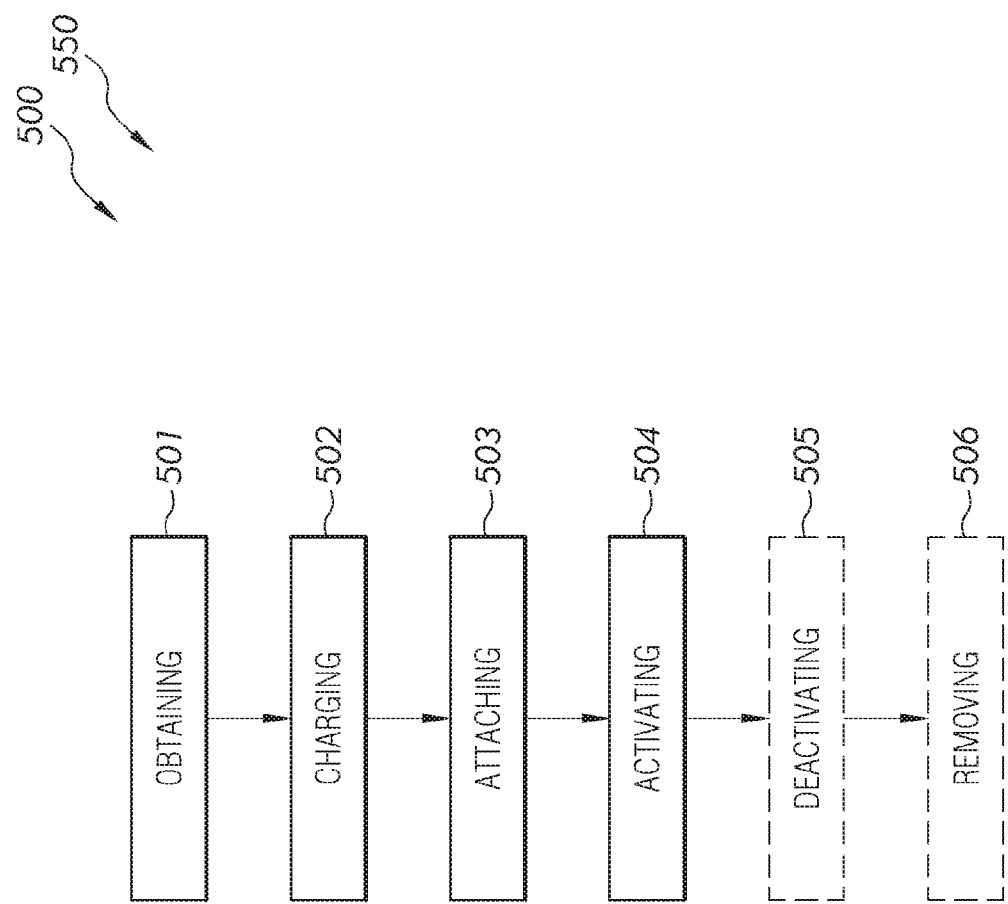

VEHICLE EMERGENCY LIGHT BEAM SYSTEMS

CROSS-REFERENCE TO RELATED APPLICATION

The present application is related to and claims priority from prior provisional application Ser. No. 62/284,226, filed Sep. 24, 2015 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of emergency lighting for disabled vehicles and more specifically relates to vehicle emergency light beam systems.

DESCRIPTION OF RELATED ART

Motor vehicles are mechanical devices that are subject to breakdown. A disabled vehicle that is along a busy road is a hazard to motorists using the road. Alert systems for identifying a disabled vehicle use lights as a warning to oncoming traffic. Often times these lights flash or strobe as a warning. As lighting improves in efficiency and brightness direct lighting can blind oncoming drivers. A better solution is sought.

Several attempts have been made to solve the above-mentioned problems such as those found in U.S. Pat. No. 6,000,811 to Bordak, U.S. Pat. No. 6,188,317 to Wang, U.S. Pat. No. 5,450,058 to Collier, U.S. Pat. No. 5,512,876 to Brusca, and DE2003108508, to Moos and Naber. This art is representative of emergency lighting for disabled vehicles. However, none of the above inventions and patents, taken either singly or in combination, is seen to describe the invention as claimed.

Preferably, a vehicle emergency light beam system should provide a warning that a vehicle is disabled and immobile and, yet would operate reliably and be manufactured at a modest expense. Thus, a need exists for a reliable vehicle emergency light beam system to avoid the above-mentioned problems.

BRIEF SUMMARY OF THE INVENTION

In view of the foregoing disadvantages inherent in the known emergency lighting for disabled vehicles art, the present invention provides a novel vehicle emergency light beam system. The general purpose of the present invention, which will be described subsequently in greater detail is to provide a vehicle emergency light beam system.

A vehicle lighting emergency light beam system is disclosed herein for the purpose of coupling to the rear of a disabled vehicle in order to warn oncoming motorists with indirect lighting. The rear facing light utilizes a programmable plurality of light fixtures each of which is directed using a light visor extension in a manner that avoids blinding an approaching driver. The device can emit various light colors and modes such as strobe, flashing, or constant light making it versatile in the event of a breakdown no matter what time of day it is. The disclosure is made of high impact plastic and sealed from the weather. A rechargeable battery and a plurality of charging ports enable operation without vehicle power and charging via a number of methods including USB and automotive 12 volt sources. An illuminated, multi-function switch enables a driver to easily power the device as well as select an operation mode. The switch also provides an indication of battery charge levels.

The vehicle emergency light beam system comprises together in functional combination a weatherproof housing including a plurality of LED light fixtures at least one multi-function switch, a plurality of charging ports, a rechargeable battery, at least one light electronics module, and at least one magnetic attachment mechanism. The plurality of LED light fixtures includes a plurality of LED lights, a clear protective lens, and a light reflective housing. The at least one multi-function switch includes a battery level indicator light. The light electronics module, plurality of LED lights, at least one multi-function switch, plurality of charging ports, and rechargeable battery are electrically connected in functional combination for the purpose of indirectly transmitting light from a rear of a vehicle during an emergency situation as well as charging and directing power from the rechargeable battery. The plurality of LED lights comprises a multitude of colors. The weatherproof housing may be composed of at least six, flat sides made of high impact plastic and arranged in a functional combination with the plurality of LED light fixtures the plurality of light visor extensions, at least one multi-function switch, and the plurality of charging ports in a manner that provides a hermetic seal. The plurality of LED light fixtures is oriented such that the light visor extensions project light from the plurality of LED lights at an angle of 30 degrees with respect to one flat side of the weatherproof housing.

The at least one multi-function switch controls power to a vehicle emergency light beam system, color choice of the plurality of LED lights and activates a strobe mode, a flashing mode, or a constant light mode of a plurality of LED lights. The plurality of charging ports accepts 12 volt automotive power and USB input power. The at least one magnetic attachment mechanism is mounted to an external surface on a weatherproof housing for the purpose of coupling the vehicle emergency light beam system to a disabled vehicle.

The vehicle emergency light beam system can be sold as a kit including a set of instructions and a plurality of charging cords with end connectors that match a plurality of charging ports and a source power. The disclosure includes a method of using a vehicle emergency light beam system including the steps of obtaining a vehicle emergency light beam system, charging a vehicle emergency light beam system, attaching a vehicle emergency light beam system to a vehicle, and activating a vehicle emergency light beam system via at least one multi-function switch. The disclosure also includes the steps of deactivating a vehicle emergency light beam system via the at least one multi-function switch, and removing the vehicle emergency light beam system from a vehicle.

The present invention holds significant improvements and serves as a vehicle lighting emergency light beam system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vehicle emergency light beam systems, constructed and operative according to the teachings of the present invention.

FIG. 5 is a flowchart illustrating a method of use for the vehicle emergency light beam system according to an embodiment of the present invention of FIGS. 1-4.

The various embodiments of the present invention will hereinafter be described in conjunction with the appended drawings, wherein like designations denote like elements.

DETAILED DESCRIPTION

As discussed above, embodiments of the present invention relate to a lighted warning for a disabled vehicle and more particularly to a vehicle emergency light beam system as used to improve the ability to warn oncoming drivers without blinding them with direct light.

Generally speaking, a vehicle emergency light beam system is used to warn oncoming traffic of a disabled vehicle. The vehicle emergency light beam system disclosed herein offers various operating modes in addition to providing the advantage of constant light for illumination of a given area. The disclosure provides a warning system that projects indirect light thus avoiding the potential for blinding oncoming traffic. The disclosure claims a removably coupleable system in the preferred embodiment as well as an integrated system in alternate embodiments.

Figure 1:
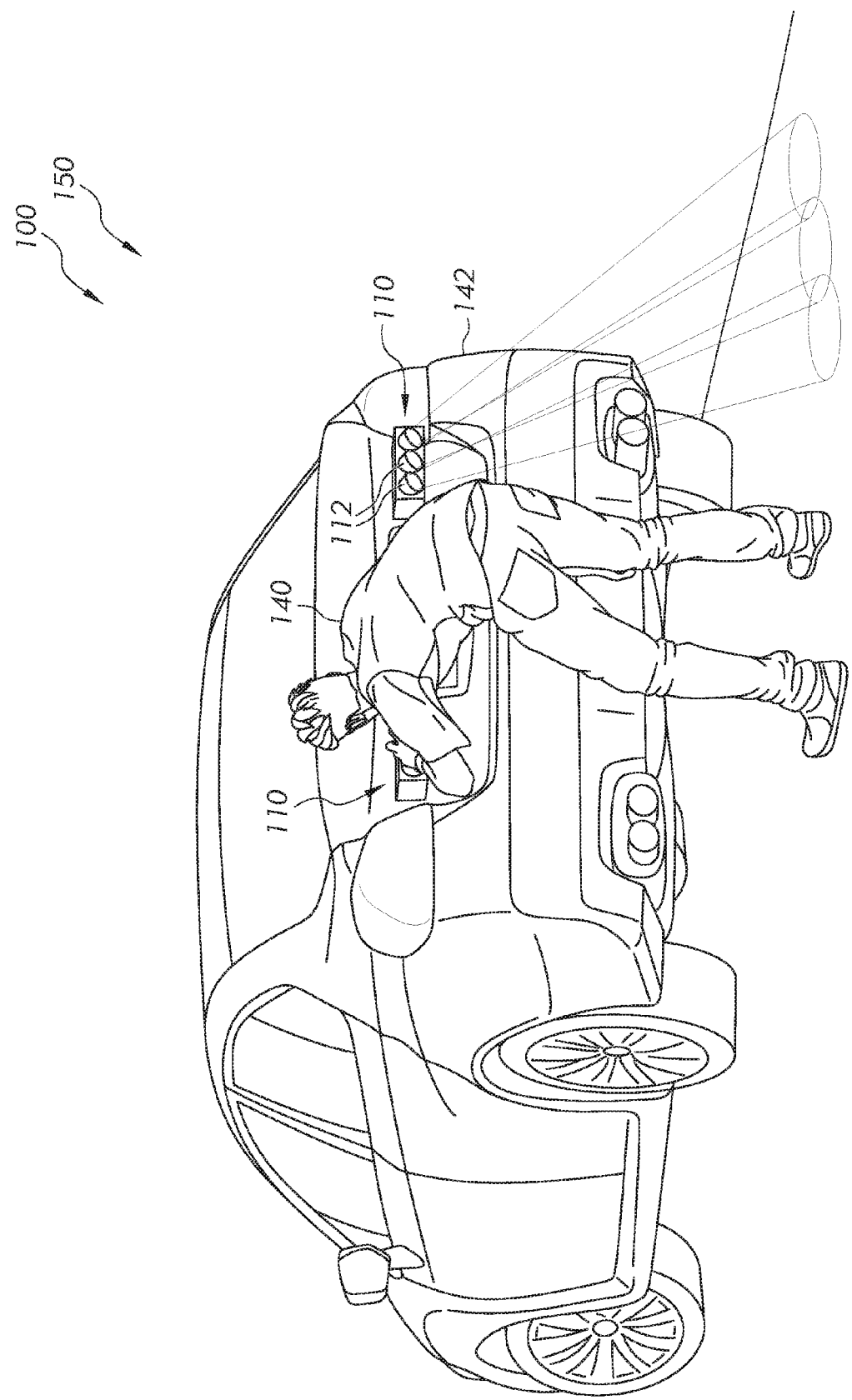
FIG. 1 shows a perspective view illustrating a vehicle emergency light beam system during an 'in-use' condition showing the disclosure according to an embodiment of the present invention.

Referring to the drawings by numerals of reference there is shown in FIG. 1, a vehicle emergency light beam system 100 during an 'in-use' condition 150. User 140 is shown coupling vehicle emergency light beam system 100 to a vehicle 142 with at least one magnetic attachment mechanism 118 (FIG. 3).

Figure 2:
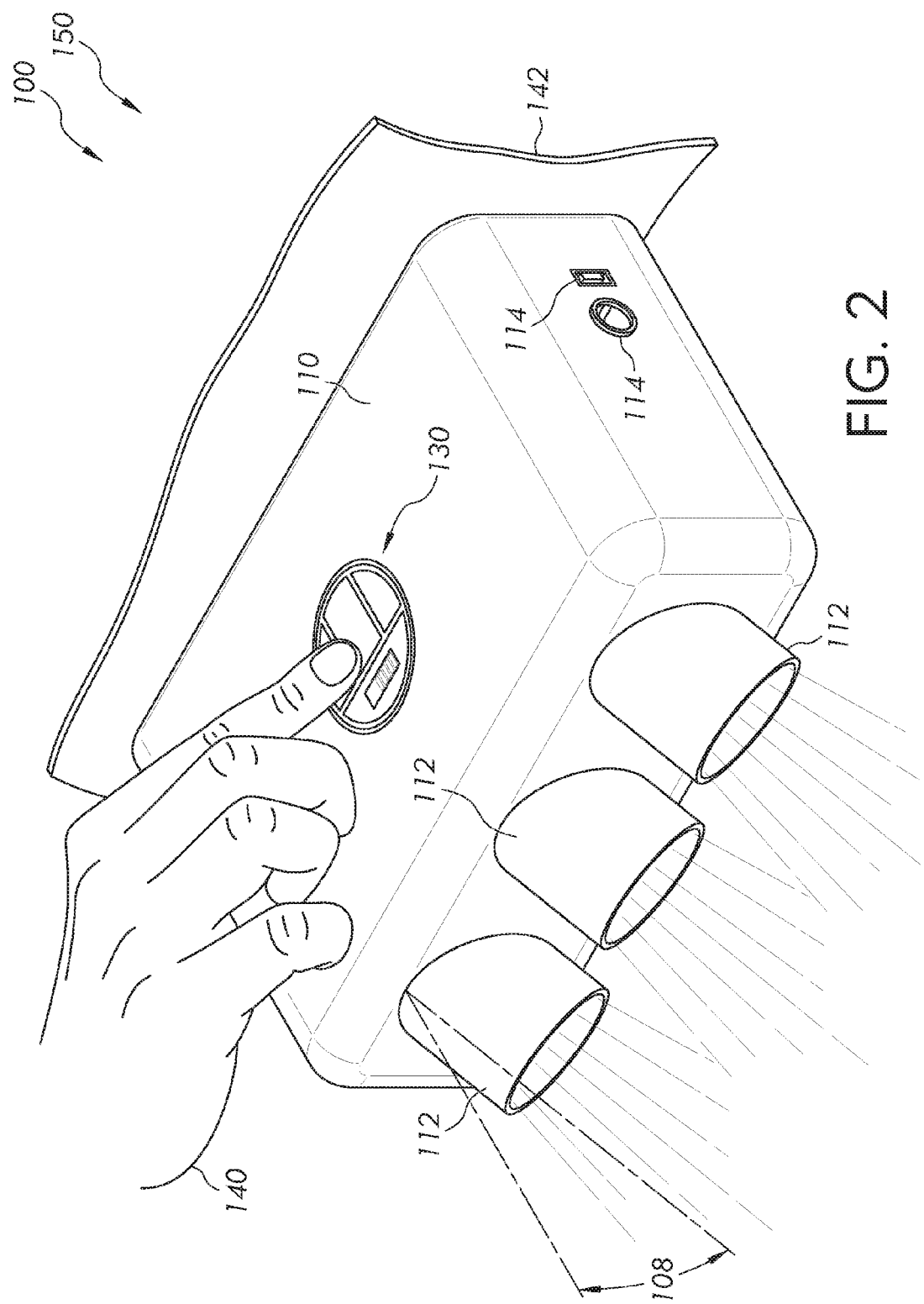
FIG. 2 is an 'in-use' condition view illustrating the vehicle emergency light beam system according to an embodiment of the present invention of FIG. 1.

Referring now to FIG. 2, vehicle emergency light beam system 100 is shown during an 'in-use' condition 150 with a user 140 activating the plurality of LED light fixtures 120 by depressing at least one multi-function switch 130. Also shown in FIG. 2 is weatherproof housing 110 that provides structure for supporting plurality of LED light fixtures 120, plurality of charging ports 114, and at least one multi-function switch 130. In the preferred embodiment weatherproof housing 110 is made of high impact plastic and is hermetically sealed. In alternate embodiments weatherproof housing 110 may be made of metals such as aluminum or steel. Light visor extension 112 is preferably oriented at a 30 degree visor downward angle 108 with respect to one surface of weatherproof housing 110 so as to display emergency lighting that alerts approaching drivers without shining directly in their eyes. At least one multi-function switch 130 enables several modes of operation including strobe, flashing, and constant light. Also in the preferred embodiment, plurality of charging ports 114 comprise at least one, female USB port and one standard, 12V automotive, cylindrical, receptacle for the purpose of charging rechargeable battery 116. In alternate embodiments plurality of charging ports 114 may comprise connectors associated with standard household AC voltage.

Figure 3:
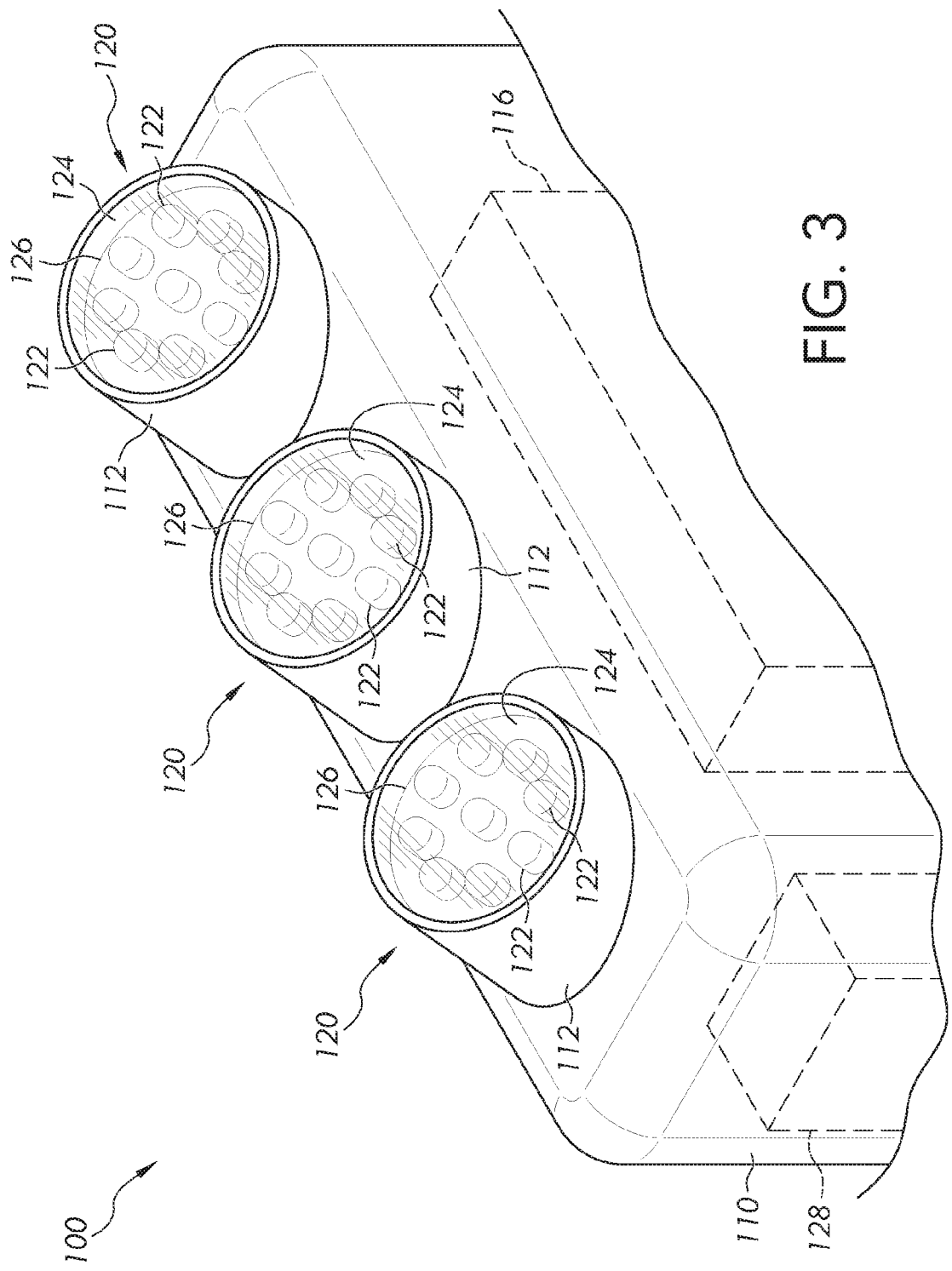
FIG. 3 is a perspective view illustrating the vehicle emergency light beam assembly according to an embodiment of the present invention of FIGS. 1-2.

Referring now to FIG. 3, vehicle emergency light beam system 100 is shown with plurality of LED light fixtures 120. Plurality of LED light fixtures 120 includes clear protective lens 124, light reflective housing 126, light visor extension 112, and plurality of LED lights 122 together in functional and structural combination so as to shine emergency lighting in a predetermined direction. In the preferred embodiment, plurality of LED lights 122 is composed of white LEDs. In alternate embodiments plurality of LED lights 122 is composed of a multitude of colors.

Also shown in FIG. 3 is at least one light electronics module 128 and rechargeable battery 116 that work together in functional combination to power and control emergency lighting from plurality of LED light fixtures 120. At least one multi-function switch 130 (FIG. 2) is electrically connected to and works in functional combination with rechargeable battery 116 and at least one light electronics module 128 to power and control the plurality of LED light fixtures 120 operation and mode.

Figure 4:
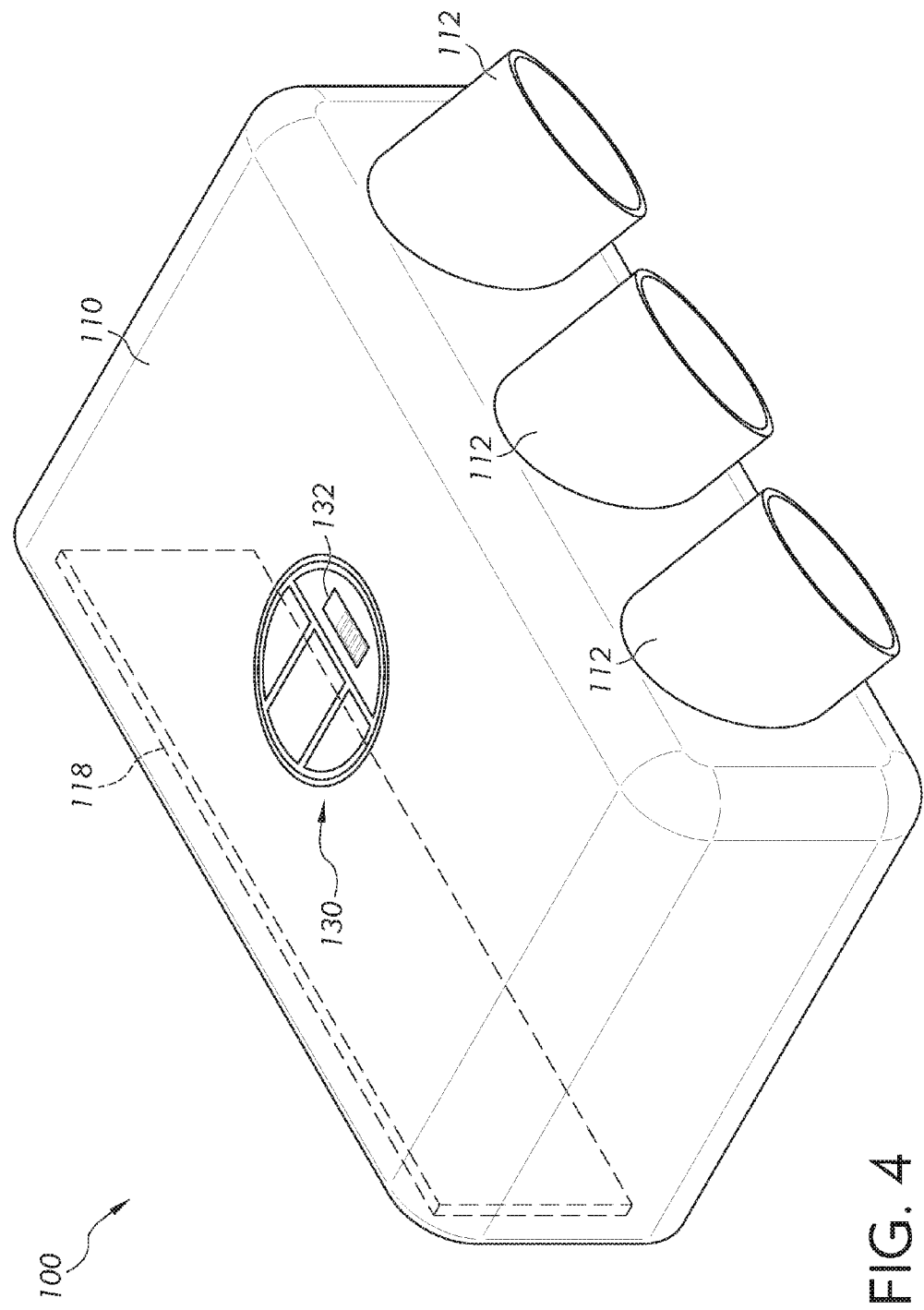
FIG. 4 is a perspective view illustrating the vehicle emergency light beam system according to an embodiment of the present invention of FIGS. 1-3.

Referring now to FIG. 4, vehicle emergency light beam system 100 is shown in the preferred embodiment comprising weatherproof housing 110, plurality of LED light fixtures 120, at least one magnetic attachment mechanism 118, and at least one multi-function switch 130. At least one multi-function switch 130 includes battery level indicator light 132 as a method of alerting user 140 of charge levels. At least one multi-function switch 130 has the additional benefit of being illuminated for user identification when in the "OFF" state.

Weatherproof housing 110, plurality of LED light fixtures 120, and at least one magnetic attachment mechanism 118 work together in structural and functional combination for the purpose of directing emergency lighting from the back of vehicle 142. In the preferred embodiment vehicle emergency light beam system 100 is removable coupleable from vehicle 142. In alternate embodiments vehicle emergency light beam system 100 may be integrated into a surface of vehicle 142. In the preferred embodiment at least one magnetic attachment mechanism 118 is mounted on the surface directly opposite the plurality of LED light fixtures 120. In alternate embodiments one or several of at least one magnetic attachment mechanism 118 may be mounted on any of the external surfaces of the weatherproof housing 110 thus enabling a multitude of removably coupleable arrangements for adjusting to varying surfaces on vehicle 142.

It should be noted that vehicle emergency light beam systems 100 may be sold as kit 440 comprising the following parts: at least one vehicle emergency light beam system 100 and at least one set of user instructions. The kit has instructions such that functional relationships are detailed in relation to the structure of the invention (such that the invention can be used, maintained, or the like in a preferred manner). Vehicle emergency light beam system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different lighting means and combinations, parts may be sold separately, etc., may be sufficient.

Referring now to FIG. 5 showing flowchart 550 illustrating method of use 500 for vehicle emergency light beam system 100 according to an embodiment of the present invention of FIGS. 1-4. As shown, method of use 500 may comprise the steps of: step one 501, obtaining vehicle emergency light beam system 100, step two 502 charging vehicle emergency light beam system 100, step three 503 attaching vehicle emergency light beam system 100 to a vehicle 142, step four 504 activating vehicle emergency light beam system 100 via at least one multi-function switch 130, step five 505 deactivating vehicle emergency light beam system 100 via at least one multi-function switch 130, and step six 506 removing vehicle emergency light beam system 100 from vehicle.

It should be noted that steps 505 and 506 are optional and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle emergency light beam system for a vehicle, the vehicle emergency light beam system comprising together in functional combination:
    a weatherproof housing having a front, a back, a top and a bottom, said weatherproof housing including:
        a plurality of LED light fixtures including:
            a plurality of LED lights,
            a clear protective lens, and
            a light reflective housing;
        a plurality of light visor extensions configured to direct light indirectly from the plurality of LED lights at a fixed angle that is forward and downward, relative to the front and the bottom of the weatherproof housing;
        at least one multi-function switch comprising a battery level indicator light;
        a plurality of charging ports;
        a rechargeable battery;
        at least one light electronics module; and
        at least one magnetic attachment mechanism configured to attach the weatherproof housing to the vehicle;
    wherein said light electronics module, said plurality of LED lights, said at least one multi-function switch, said plurality of charging ports, and said rechargeable battery are electrically connected in functional combination for the purpose of indirectly transmitting light from a rear of the vehicle during an emergency situation.

2. The vehicle emergency light beam system of claim 1 wherein said plurality of LED lights comprise a multitude of colors.

3. The vehicle emergency light beam system of claim 1 wherein said weatherproof housing is composed of at least six, flat sides.

4. The vehicle emergency light beam system of claim 3 wherein said plurality of LED light fixtures is oriented such that said light visor extensions project light from said plurality of LED lights at a fixed angle of 30 degrees with respect to one said flat side of said weatherproof housing, and in a downward direction relative to the vehicle.

5. The vehicle emergency light beam system of claim 1 wherein said weatherproof housing is comprised of high impact plastic.

6. The vehicle emergency light beam system of claim 5 wherein said weatherproof housing is hermetically sealed.

7. The vehicle emergency light beam system of claim 1 wherein said at least one multi-function switch controls power to said vehicle emergency light beam system.

8. The vehicle emergency light beam system of claim 1 wherein said at least one multi-function switch controls color choice of said plurality of LED lights.

9. The vehicle emergency light beam system of claim 1 wherein said at least one multi-function switch activates a strobe mode of said plurality of LED lights.

10. The vehicle emergency light beam system of claim 1 wherein said at least one multi-function switch activates a flashing mode of said plurality of LED lights.

11. The vehicle emergency light beam system of claim 1 wherein said at least one multi-function switch activates a constant light mode of said plurality of LED lights.

12. The vehicle emergency light beam system of claim 1 wherein said plurality of charging ports accepts 12 volt automotive power.

13. The vehicle emergency light beam system of claim 12 wherein said plurality of charging ports accepts USB input power.

14. The vehicle emergency light beam system of claim 12 wherein said plurality of charging ports accepts standard household AC voltage.

15. The vehicle emergency light beam system of claim 1 wherein the at least one magnetic attachment mechanism is configured to couple at least one of the back and the bottom of the weatherproof housing to the vehicle, such that the front of the weatherproof housing is rearward facing, relative to the vehicle.

16. The vehicle emergency light beam system of claim 1 wherein said at least one magnetic attachment mechanism is mounted to an external surface on the back of said weatherproof housing.

17. A vehicle emergency light beam system for a vehicle, the vehicle emergency light beam system comprising together in functional combination:
   a weatherproof housing having a front, a back, a top and a bottom, said weatherproof housing including:
      a plurality of LED light fixtures including:
         a plurality of LED lights,
         a clear protective lens, and
         a light reflective housing;
      a plurality of light visor extensions configured to direct light indirectly from the plurality of LED lights at a fixed angle that is forward and downward, relative to the front and the bottom of the weatherproof housing;
      at least one multi-function switch comprising a battery level indicator light;
      a plurality of charging ports;
      a rechargeable battery;
      at least one light electronics module; and
      at least one magnetic attachment mechanism configured to couple the weatherproof housing to the vehicle;
   wherein said light electronics module, said plurality of LED lights, said at least one multi-function switch, said plurality of charging ports, and said rechargeable battery are electrically connected in functional combination for the purpose of indirectly transmitting light from a rear of the vehicle during an emergency situation;
   wherein said plurality of LED lights comprises a multitude of colors;
   wherein said weatherproof housing is composed of at least six, flat sides;
   wherein said plurality of LED light fixtures is oriented such that said light visor extensions project light from said plurality of LED lights at a fixed angle of 30 degrees with respect to one said flat side of said weatherproof housing, and in a downward direction relative to the vehicle;
   wherein said weatherproof housing is comprised of high impact plastic;
   wherein said weatherproof housing is hermetically sealed;
   wherein said at least one multi-function switch controls power to said vehicle emergency light beam system;
   wherein said at least one multi-function switch controls color choice of said plurality of LED lights is able to activate a strobe mode of said plurality of LED lights, is able to activate a flashing mode of said plurality of LED lights, is able to activate a constant light mode of said plurality of LED lights;
   wherein at least one of said plurality of charging ports accepts 12 volt automotive power;
   wherein at least one of said plurality of charging ports accepts USB input power; and
   wherein said at least one magnetic attachment mechanism is mounted to an external surface on the back of said weatherproof housing.

18. The vehicle emergency light beam system of claim 17 further comprising:
   a set of instructions; and
   a plurality of charging cords with end connectors that match said plurality of charging ports and said source power; and
   wherein the vehicle emergency light beam system is arranged as a kit.

19. A method of indirectly transmitting light from a rear of a vehicle, the method comprising the steps of:
   obtaining a vehicle emergency light beam system including together in functional combination: a weatherproof housing having a front, a back, a top and a bottom, said weatherproof housing including: a plurality of LED light fixtures including: a plurality of LED lights, a clear protective lens, and a light reflective housing, a plurality of light visor extensions configured to direct light indirectly from the plurality of LED lights at a fixed angle that is forward and downward, relative to the front and the bottom of the weatherproof housing, at least one multi-function switch comprising a battery level indicator light, a plurality of charging ports, a rechargeable battery, at least one light electronics module, and at least one magnetic attachment mechanism configured to couple the weatherproof housing to the vehicle;
   charging said vehicle emergency light beam system;
   attaching said vehicle emergency light beam system to a vehicle; and
   activating said vehicle emergency light beam system via at least one multi-function switch.

20. The method of claim 19 further comprising the steps of:
   deactivating said vehicle emergency light beam system via said at least one multi-function switch; and
   removing said vehicle emergency light beam system from said vehicle.

* * * * *